(12) United States Patent
Kim et al.

(10) Patent No.: US 9,759,876 B2
(45) Date of Patent: Sep. 12, 2017

(54) MULTI-CHANNEL OPTICAL MODULE

(71) Applicant: Electronics and Telecommunications Research Institute, Daejeon (KR)

(72) Inventors: Jeong Eun Kim, Gwangju (KR); Hyun Seo Kang, Gwangju (KR); Hyoungjun Park, Gwangju (KR); Keo-Sik Kim, Gwangju (KR); Ji Hyoung Ryu, Jeollabuk-do (KR); Eun Kyoung Jeon, Gwangju (KR); Young Soon Heo, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/091,032

(22) Filed: Apr. 5, 2016

(65) Prior Publication Data

US 2017/0146755 A1     May 25, 2017

(30) Foreign Application Priority Data

Nov. 23, 2015  (KR) .......................... 10-2015-0164150

(51) Int. Cl.
G02B 6/28   (2006.01)
G02B 6/42   (2006.01)
G02B 6/32   (2006.01)
G02B 6/293  (2006.01)

(52) U.S. Cl.
CPC ....... *G02B 6/4246* (2013.01); *G02B 6/29362* (2013.01); *G02B 6/325* (2013.01); *G02B 6/4215* (2013.01); *G02B 6/4262* (2013.01); *G02B 6/4295* (2013.01)

(58) Field of Classification Search
CPC .. G02B 6/4263; G02B 6/4214; G02B 6/4215; G02B 6/4246; G02B 6/29362; G02B 6/325; G02B 6/4262; G02B 6/4295
See application file for complete search history.

(56) References Cited

U.S. PATENT DOCUMENTS

| | | | | |
|---|---|---|---|---|
| 6,748,143 B2 * | 6/2004 | Kuhara | ................ | G02B 6/4246 385/49 |
| 8,036,533 B2 * | 10/2011 | Hosomi | ............... | G02B 6/4215 398/79 |
| 8,303,195 B2 * | 11/2012 | Adachi | ................ | G02B 6/4204 385/73 |

(Continued)

FOREIGN PATENT DOCUMENTS

| | | |
|---|---|---|
| KR | 10-0480252 B1 | 4/2005 |
| KR | 10-0985362 B1 | 10/2010 |

(Continued)

*Primary Examiner* — Rhonda Peace
(74) *Attorney, Agent, or Firm* — Nelson Mullins Riley & Scarborough LLP

(57) ABSTRACT

A multi-channel optical module includes a stem configured to allow an optical active element transmitting and receiving an optical signal to be installed thereon, an optical module frame connected to the stem and configured to have an optical element forming an optical path corresponding to the optical active element, and an external housing configured to house the optical module frame therein and coupled to the stem, wherein the optical element includes a lens and a filter unit disposed in the optical path and an optical waveguide element to which an optical fiber is connected.

8 Claims, 6 Drawing Sheets

(56) References Cited

U.S. PATENT DOCUMENTS

| | | | |
|---|---|---|---|
| 8,540,437 B2* | 9/2013 | Lee | G02B 6/4215 385/31 |
| 8,641,298 B2* | 2/2014 | Lim | G02B 6/4246 385/14 |
| 8,777,497 B2* | 7/2014 | Kim | G02B 6/4246 385/14 |
| 8,909,058 B2* | 12/2014 | Sheu | H04B 10/40 398/138 |
| 9,042,740 B2 | 5/2015 | Han et al. | |
| 9,081,157 B2* | 7/2015 | Shin | G02B 6/4206 |
| 9,250,401 B2* | 2/2016 | Lim | G02B 6/4215 |
| 2004/0071413 A1 | 4/2004 | Tsumori | |
| 2006/0088255 A1 | 4/2006 | Wu et al. | |
| 2009/0097847 A1* | 4/2009 | Hosomi | G02B 6/29367 398/43 |
| 2010/0183268 A1 | 7/2010 | Kihara et al. | |
| 2010/0278482 A1* | 11/2010 | Adachi | G02B 6/4204 385/33 |
| 2011/0058771 A1* | 3/2011 | Lee | G02B 6/4215 385/33 |
| 2012/0128295 A1* | 5/2012 | Lim | G02B 6/4246 385/24 |
| 2012/0132792 A1 | 5/2012 | Choe et al. | |
| 2013/0051024 A1* | 2/2013 | Amit | H04B 10/40 362/259 |
| 2013/0089337 A1* | 4/2013 | Kim | G02B 6/4246 398/139 |
| 2013/0108262 A1* | 5/2013 | Lim | G02B 6/4215 398/43 |
| 2014/0061451 A1* | 3/2014 | Park | G02B 6/4224 250/227.11 |

FOREIGN PATENT DOCUMENTS

| | | |
|---|---|---|
| KR | 10-2012-0016033 A | 2/2012 |
| KR | 10-2014-0033559 A | 3/2014 |
| KR | 10-2015-0057861 A | 5/2015 |

* cited by examiner

MULTI-CHANNEL OPTICAL MODULE

CROSS-REFERENCE TO RELATED APPLICATION

This application claims priority to and the benefit of Korean Patent Application No. 10-2015-0164150 filed in the Korean Intellectual Property Office on Nov. 23, 2015, the entire contents of which are incorporated herein by reference.

BACKGROUND OF THE INVENTION (a) Field of the Invention

The present invention relates to a multi-channel optical module.

(b) Description of the Related Art

The necessity of large capacity and high-speed information communication has recently spurred changes to multi-channel optical modules. In particular, demand for multi-channel optical modules allowing an optical signal having a plurality of wavelengths to be transmitted or received through a single optical fiber is on the increase.

In general, a bidirectional optical communication method of transmitting uplink optical communication in which an optical signal is generated within a home of a communication subscriber and transmitted to a base station of optical communication and downlink optical communication in which an optical signal transmitted from the base station of optical communication is converted into an electrical signal, through a single strand of optical fiber is widely used.

Thus, techniques regarding various types of two-way optical modules manufactured such that an optical reception element receiving an optical signal transmitted through an optical fiber in downlink and converting the received optical signal into an electrical signal and an optical transmission element converting an electrical signal into an optical signal and transmitting the converted optical signal are integrated and optically coupled with optical fiber have been actively proposed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a multi-channel optical module available for bidirectional optical communication having advantages of transmitting large capacity information at a high speed and having enhanced optical coupling efficiency and productivity through a simplified internal structure.

An exemplary embodiment of the present invention provides a multi-channel optical module including: a stem configured to allow an optical active element transmitting and receiving an optical signal to be installed thereon; an optical module frame connected to the stem and configured to have an optical element forming an optical path corresponding to the optical active element; and an external housing configured to house the optical module frame therein and coupled to the stem, wherein the optical element includes a lens and a filter unit disposed in the optical path and an optical waveguide element to which an optical fiber is connected.

The optical module frame may include a connection ring vertically connected to the stem and connected along an outer side of the stem.

The filter unit may be disposed on both sides of the optical module frame to form the optical path.

The filter unit may include: an optical filter configured to allow a specific wavelength to be reflected or transmitted; and a filter holder allowing the optical filter to be installed to be sloped therein.

The filter holder may be formed to be sloped at 45°.

The lens may be disposed on both sides of the optical module frame and positioned below the filter unit to correspond to the filter unit to form the optical path.

The optical active element may include: a laser diode configured to emit a light source having a specific wavelength; and a photodiode configured to receive a light source having a specific wavelength.

The optical waveguide element may include: an optical coupler configured to transmit the light source having the specific wavelength emitted from the laser diode to the optical fiber; and an optical splitter configured to divide a single optical signal transmitted from the optical fiber into optical signals having the same strength and transmit the optical signals to the photodiode.

The multi-channel optical module may further include: a stem cap configured to protect the optical active element and connected to the stem.

The stem cap may include a window, and the window may be formed of sapphire glass or glass.

DETAILED DESCRIPTION OF THE EMBODIMENTS

Figure 1:
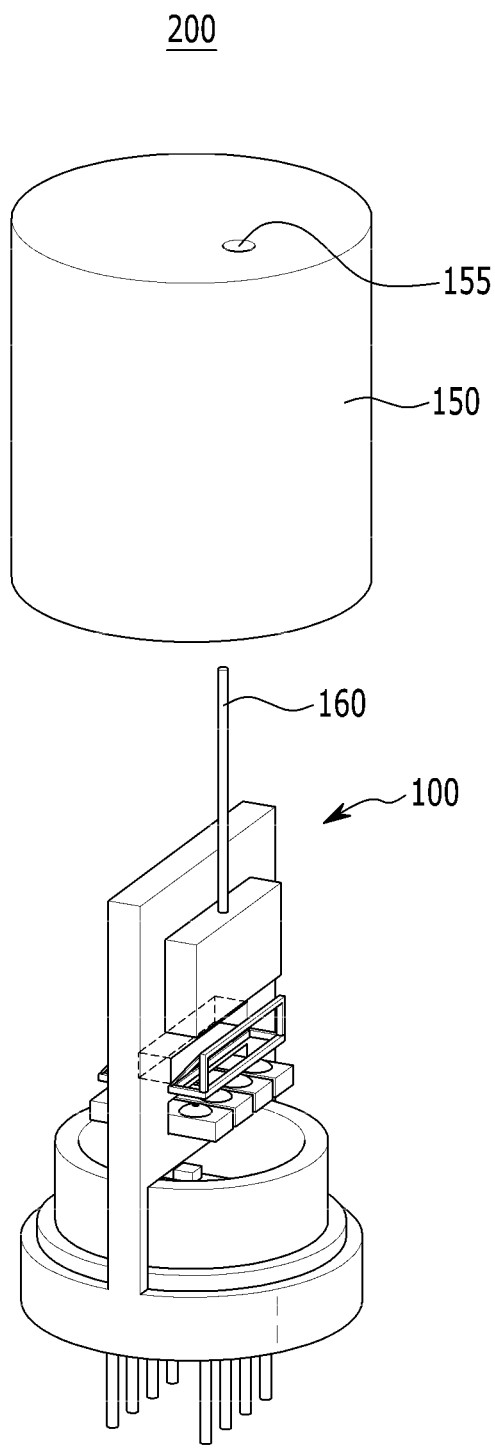
FIG. 1 is a disassembled perspective view of an optical module according to an exemplary embodiment of the present invention.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In the drawings, the components are arbitrarily shown for the description purposes, so the present invention is not limited to the illustrations of the drawings In addition, unless explicitly described to the contrary, the word "comprise" and variations such as "comprises" or "comprising", will be understood to imply the inclusion of stated elements but not the exclusion of any other elements.

FIG. 1 is a disassembled perspective view of an optical module according to an exemplary embodiment of the present invention.

Referring to FIG. 1, an optical module 200 has a configuration including a stem 10 including an optical active element 17 transmitting and receiving an optical signal 18 (please refer to FIG. 6), an optical module frame 100 forming an optical path of an optical signal, and an external housing 150 housing the stem 10 and the optical module frame 100 therein.

The external housing 150 may prevent damage to a component and the optical module frame 100 mounted in the optical module 200 due to external impact. An optical fiber 160, a lead-in hole 155, or an optical fiber connector (not shown) that may be connected to the optical fiber 160 may be formed on an upper portion of the external housing 150.

The optical signal 18 transmitted and received through the optical fiber 160 may have a plurality of wavelengths. That is, the optical signal 18 having a plurality of channels in which different wavelengths are transmitted and received may be transmitted and received through the single optical fiber 160. The optical fiber 160 may be connected to the optical module frame 100 through the lead-in hole 155 of the external housing 150.

A plurality of optical active elements 17 may be installed in the stem 10. The optical active elements 17 may include an optical reception element 17a converting the optical signal 18 received through the optical fiber 160 into an electrical signal and an optical transmission element 17b converting an electrical signal into the optical signal 18 and transmitting the converted optical signal 18 through the optical fiber 160. The number of the plurality of optical active elements 17 installed in the stem 10 refers to the number of channels.

The optical module frame 100 is protected from external impact by the external housing 150 and connected to the stem 10. In particular, the optical module frame 100 is formed to be perpendicular to the stem 10.

Optical paths may be formed according to the number of channels in the optical module frame 100. In particular, in order to form a larger number of optical paths in a small space, optical paths may be formed on both sides of the optical module frame 100. Also, the optical module frame 100 may be connected to the optical fiber 160 and transmit and receive an optical signal to and from the optical fiber 160.

Figure 2:
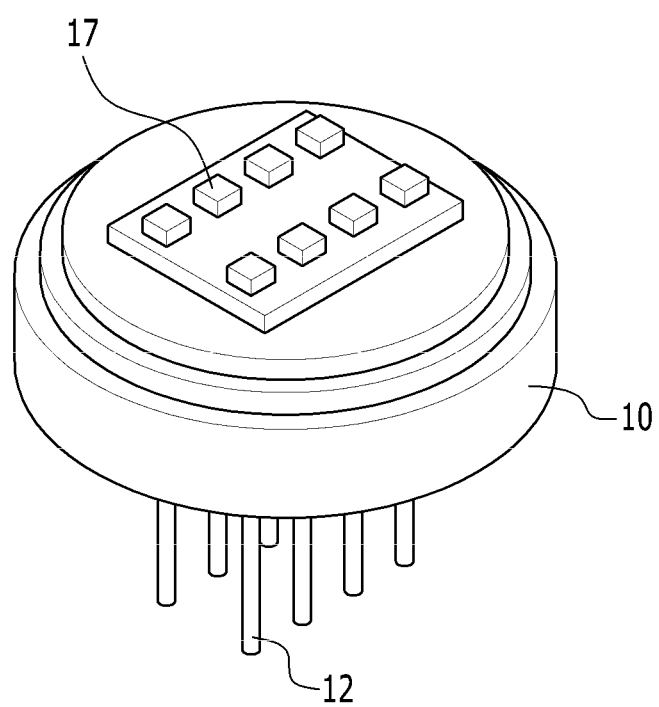
FIG. 2 is a perspective view of a stem applied to the optical module illustrated in FIG. 1.

FIG. 2 is a perspective view of a stem applied to the optical module illustrated in FIG. 1.

Referring to FIG. 2, the plurality of optical active elements 17 may be installed in the stem 10. The stem 10 of the optical module 200 may be connected to a board. The stem 10 may be a transistor outline (TO) stem or a flat-type stem.

A step may be formed at an outer side of the stem 10. The stem 10 may have a circular shape and the step may be formed along the circumference of the stem 10. A plurality of steps may be formed.

The stem 10 includes a plurality of stem pins 12. The stem pins 12 may be formed to penetrate through upper and lower surfaces of the stem 10 through through holes (not shown) formed in the stem 10, and may protrude in a direction of a lower surface of the stem 10. The stem pins 12 may include a signal pin (not shown) electrically connected to the optical active element 17 disposed on the upper surface of the stem 10 and other electrical elements to provide a signal having a meaningful value and a ground pin (not shown) electrically connected to the signal pin.

The plurality of optical active elements 17 may be installed on the upper surface of the stem 10. The plurality of optical active elements 17 may be disposed in two rows in the stem 10.

The optical active elements 17 may include the optical reception element 17a, the optical transmission element 17b, or a combination of the optical reception element 17a and the optical transmission element 17b. In particular, positions of the optical active elements 17 may be combined into the number of various cases on the upper surface of the stem 10.

That is, channels that may be able to transmit or receive the optical signals 18 having different wavelengths may be configured by variously disposing the optical active elements 17.

For example, in a case in which the optical active elements 17 totals 4, the number of channels is 4, and the number of cases of channels that may be configured by combining the optical active elements 17 is In another example, in case of the optical active elements 17 totals 8, and the number of cases of channels that may be configured by combining the optical active elements 17 is $2^8$.

Thus, the number of cases of the channels configured by combining the plurality of optical active elements 17 is increased to an involution multiple of 2, and thus, a user may variously configure channels according to purposes.

For example, in a case in which the optical reception elements 17a are arranged in a first row and the optical transmission elements 17b are installed in a second row, the optical module 200 having four reception channels and four transmission channels may be manufactured.

Due to the optical active elements 17 disposed in two rows, optical paths may be formed on both sides of the optical module frame 100 to thus form a larger number of channels in a relatively narrow space. Thus, the optical paths may be simply formed on both sides of the optical module frame 100, and accordingly, the optical signals 18 having different wavelengths may be transmitted to the optical fiber 160 or the optical active elements 17.

Unlike the aforementioned embodiment, the optical reception elements 17a and the optical transmission elements 17b may be mixed to coexist on the stem 10. The number of the optical reception elements 17a and the number of the optical transmission elements 17b may be different. That is, a larger number of optical reception elements 17a than the optical transmission elements 17b may be formed.

A thermoelectric element may be included in the stem 10. The thermoelectric element may be mounted on the upper surface of the stem 10. For example, in a case in which a temperature of the optical module 200 (please refer to FIG. 1) is increased due to the optical active element 17 so cooling is performed, in a case in which a temperature of the optical module 200 is increased due to an external environment, or in a case in which the optical module 200 is required to be maintained at a uniform temperature, the stem 10 may include a thermoelectric cooler (TEC) element to control a temperature of the optical module 200.

The optical transmission element 17b may be a laser diode. The laser diode, a light source generating light according to current injection, may be a semiconductor laser diode manufactured using a semiconductor material.

The optical reception element 17a may be a photodiode. An optical signal may be detected by the photodiode.

Figure 3:
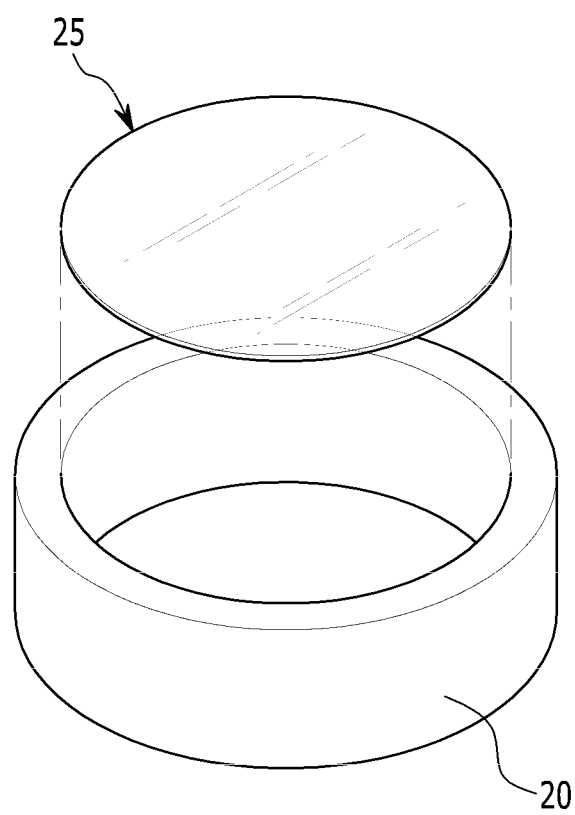
FIG. 3 is a perspective view of a stem cap applied to the optical module illustrated in FIG. 1.

FIG. 3 is a perspective view of a stem cap applied to the optical module illustrated in FIG. 1.

Referring to FIG. 3, a stem cap 20 may be connected to the stem 10. The stem cap 20 may be connected along an outer side of the stem 10 to protect the optical active element 17 installed within the stem 10.

The stem cap 20 may include a window 25. The window 25 may be installed to protect the optical active element 17 and allow the optical signal 18 (please refer to FIG. 6) transmitted to and received from the optical active element 17 to transmit therethrough.

The window 25 may be positioned between the stem cap 20 and the optical module frame 100, and the window 25 may be formed of sapphire glass or glass. Also, without being limited thereto, the window 25 may be formed of a material having high transmittance in a wavelength region of a light source in use. In the case of sapphire glass, generation of a flaw on the window 25 may be prevented, uniformly maintaining transmittance of the optical signal 18.

Figure 4:
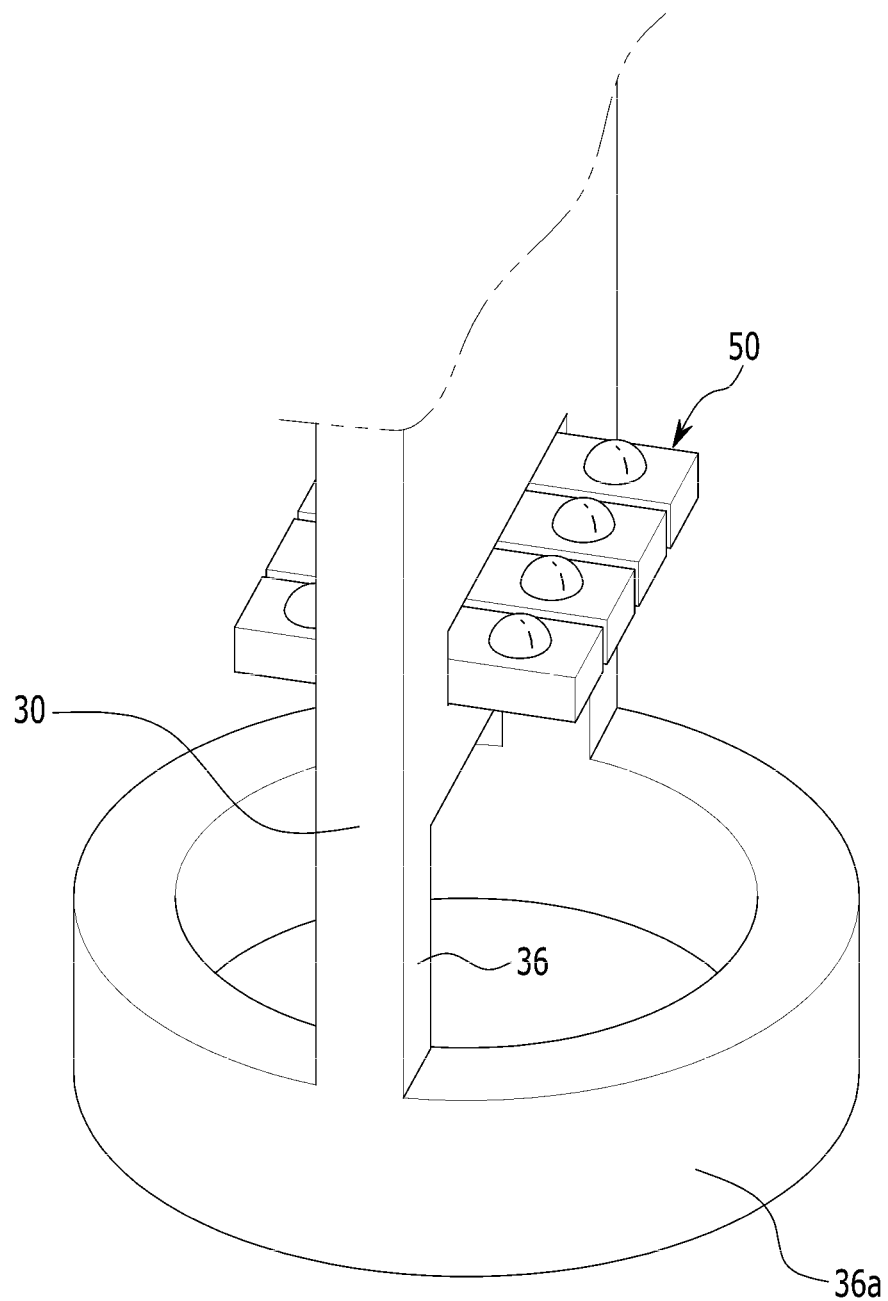
FIG. 4 is a perspective view illustrating a connection unit and a lens of an optical module frame applied to the optical module of FIG. 1.

FIG. 4 is a perspective view illustrating a connection unit and a lens of an optical module frame applied to the optical module of FIG. 1.

Referring to FIG. 4, a connection part 36 and a connection ring 36a that may be connected along the outer side of the stem 10 may be formed in a lower portion of the optical module frame 100.

The optical module frame 100 may include a frame unit 30 in which a lens 50 and a filter unit 38 are installed and the connection part 36 formed as a rectangular column. The connection ring 36a may be formed in a lower end of the connection part 36.

A height of the connection part 36 of the optical module frame 100 may be determined by a distance between the optical active element 17 (please refer to FIG. 2) installed on the stem 10 (please refer to FIG. 2) at a lower end of the frame unit 30 and the lens 50. That is, since a unique distance for the lens 50 to be separated from the light source has been determined, and thus, a height of the connection part 36 is determined in consideration of the distance from the optical active element 17 to the lens 50. The connection part 36 may have a columnar shape on both ends of the frame unit 30 such that a space may be formed at an inner side of the optical module frame 100.

The connection ring 36a of the optical module frame 100 may be connected along an outer side of the stem 10. That is, as described above, a plurality of steps may be formed on the outer side of the stem 10, and the connection ring 36a of the optical module frame 100 may be inserted into a step formed at the outer side of the stem 10 so as to be connected. As described above, the stem cap 20 (please refer to FIG. 2) is inserted so as to be connected to the stem 10, and the connection ring 36a of the optical module frame 100 may be formed to be larger than the stem cap 20 and connected in the end of the stem 10 with the stem cap 20 disposed at an inner side. Thus, the stem cap 20 may be positioned below the frame unit 30 of the optical module frame 100, and positioned between the connection parts 36.

The rectangular lens 60 may be coupled to the optical module frame 100. The lens 50 may be a focusing lens or a collimating lens for focusing the optical signal 18 (please refer to FIG. 6).

The lens may be inserted into a depressed portion (not shown) formed in the frame unit 30 of the optical module frame 100 and fixed by epoxy. The lens 50 (please refer to FIG. 6) is positioned on an optical axis.

Figure 5:
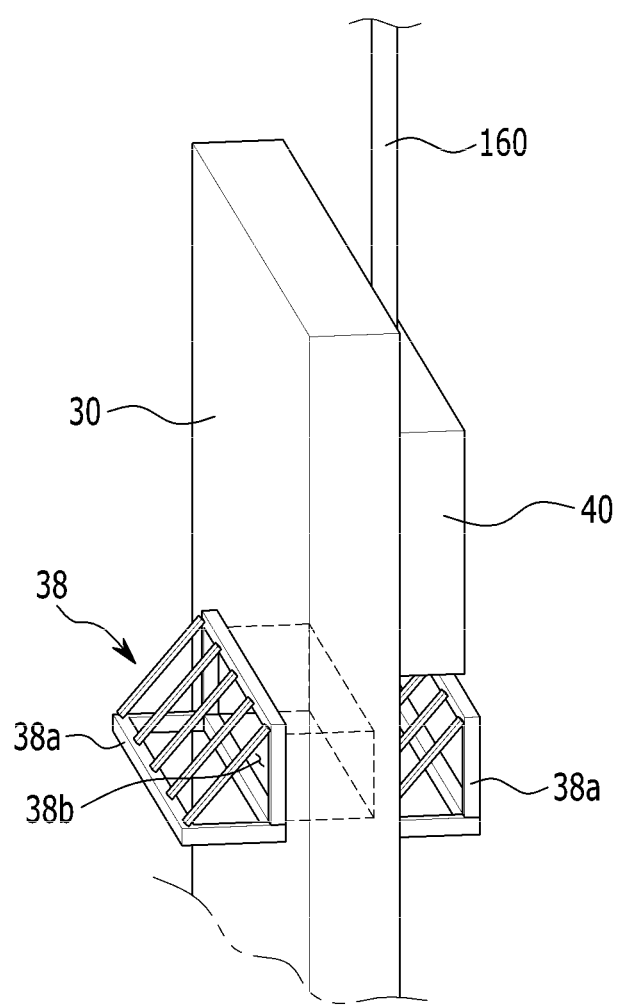
FIG. 5 is a perspective view illustrating a filter unit and an optical waveguide element of the optical module frame applied to the optical module of FIG. 1.

FIG. 5 is a perspective view illustrating a filter unit and an optical waveguide element of the optical module frame applied to the optical module of FIG. 1.

Referring to FIG. 5, the frame unit 30 of the optical module frame 100 may include the filter unit 38 and an optical waveguide element 40.

The filter unit 38 is positioned above the aforementioned lens 50. A filter 60 (please refer to FIG. 6) may be installed in the filter unit 38. The optical signal 18 (please refer to FIG. 6) emitted from the optical transmission element 17b passes through the lens 50 and is transmitted to the optical waveguide element 40 through the optical filter 60 installed in the filter unit 38, and the optical signal 18 received through the optical waveguide element 40 is filtered by the optical filter 60 installed in the filter unit 38 and the optical signal 18 having a filtered wavelength is transmitted to the optical reception element 17a through the lens 50.

Here, the optical filter 60 may be a wavelength-selective filter allowing only a specific wavelength to be selectively reflected or transmitted therethrough.

The filter unit 38 may include a filter holder 38a formed to be sloped. The filter holder 38a may be formed to be sloped at about 45°. Thus, the optical filter 60 installed in the filter holder 38a may be installed to be sloped at 45° with respect to an optical path. The filter holder 38a may be installed on both sides of the frame unit 30 of the optical module frame 100.

A first filter 62 (please refer to FIG. 6) may be installed in one filter holder 38a of the frame unit 30, and a second filter 64 (please refer to FIG. 6) may be installed in the other filter holder 38a.

A filter hole 38b may be formed between the first filter 62 and the second filter 64 such that the optical signal 18 may be smoothly transmitted and received therethrough. That is, the open filter hole 38b may be formed in the optical module frame 100. Thus, the optical signal 18 reflected by the first filter 62 may be transmitted to the second filter 64

A window (not shown) may be further installed in the filter hole 38b, and the window installed in the filter hole 38b may be sapphire glass.

A plurality of optical filters 60 may be installed in the filter holder 38a. A frame appropriate for a size of the optical filter 60 may be formed in the filter holder 38a such that the optical filter 60 may be installed therein. Also, the filter holder 38a may have a partition formed between the optical filters 60. Accordingly, the optical filter 60 may be easily installed and may be stably installed in the filter holder 38a.

The optical waveguide element 40 may be installed above the filter holder 38a and connected to the optical fiber 160 (please refer to FIG. 1). The optical waveguide element 40 may include an optical coupler and an optical splitter.

The optical waveguide element 40 may split the optical signal 18 transmitted from the optical fiber 160 into several optical signals having the same strength and distribute the optical signals, or may integrate optical signals 18 having different wavelengths transmitted from the plurality of optical transmission elements 17b into a single optical signal and transmit the single optical signal to the single optical fiber 160.

Here, the optical coupler may serve to receive several signals and transmit the received several signals to a single line. The optical splitter refers to a device dividing the optical signal 18 transmitted from the single optical fiber 160 (please refer to FIG. 1) into several optical signals having the same strength and distributing the several optical signals.

The optical signals 18 having a plurality of wavelengths, which have passed through the plurality of optical filters 60, may be transmitted as a single signal to the optical fiber 160 through the optical coupler of the optical waveguide element 40.

Figure 6:
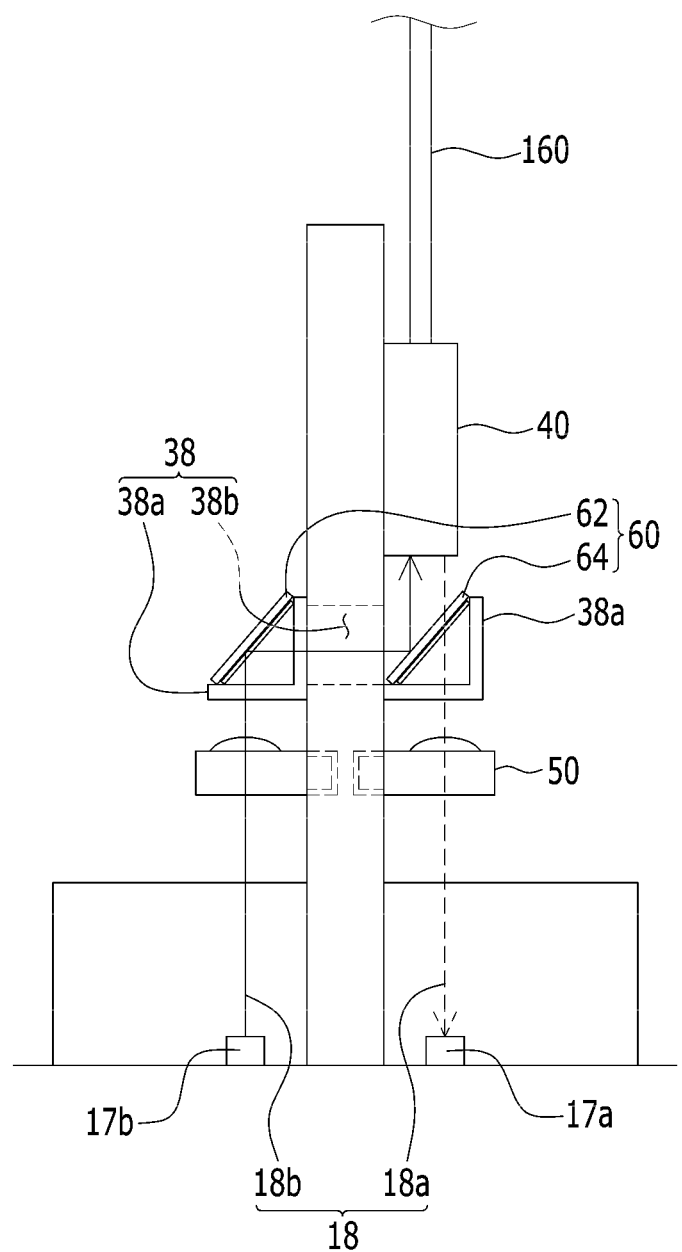
FIG. 6 is a view illustrating an optical path of an optical module according to exemplary embodiment of the present invention.

FIG. 6 is a view illustrating an optical path of an optical module according to exemplary embodiment of the present invention.

Referring to FIG. 6, the second optical signal 18b transmitted from the optical transmission element 17b and the first optical signal 18a received by the optical reception element 17a are disclosed. The second optical signal 18b as a transmitted optical signal 18 and the first optical signal 18a as a received optical signal will be described as examples.

The optical transmission element 17b may emit the optical signal 18. The second optical signal 18b as the emitted optical signal 18 may be focused by the lens 50 and transmitted to the optical filter 60. The second optical signal 18b may be focused by the lens 50, without being interfered as an optical signal having a different wavelength.

In detail, the optical transmission element 17b may emit the second optical signal 18b. The second optical signal 18b may have a natural wavelength ($\lambda_2$). The natural wavelength ($\lambda_2$) of the second optical signal 18b may be reflected by the first filter 62. The second optical signal 18b may be transmitted to the second filter 64, reflected by the second filter 64, and transmitted to the optical waveguide element 40.

That is, a plurality of optical transmission elements 17b may be disposed. The second optical signals 18b having a plurality of different wavelengths may be transmitted to the optical waveguide element 40, and the optical coupler of the optical waveguide element 40 may integrate the plurality of input different wavelengths into a single optical signal 18 and transmit the integrated optical signal through the optical fiber 160 (please refer to FIG. 1).

The optical reception element 17a may receive the optical signal 18. The optical signal 18 in which a plurality of wavelengths input from the optical fiber 160 are combined may be split into several first optical signals 18a having the same strength through the optical splitter of the optical waveguide element 40. The several first optical signals 18a may be transmitted to the second filter 64, and the wavelengths thereof may be reflected or transmitted according to characteristics of the second filter 64. The first optical signals 18a which have passed through the second filter 64 are transmitted to the optical reception element 17a.

In this manner, by allowing the specific wavelengths to be reflected or transmitted through the plurality of optical filters 60, the optical signal 18 may be divided by wavelengths.

The optical filter 60 may allow the natural wavelength ($\lambda_2$) of the second optical signal 18b to be reflected and the natural wavelength ($\lambda_1$) of the first optical signal 18a to be transmitted. Thus, the first optical signal 18a which has transmitted through the second filter 64 may be integrated by the lens 50 and transmitted to the optical reception element 17a.

According to an exemplary embodiment of the present invention, the multi-channel optical module may transmit large capacity information at a high speed and perform two-way optical communication.

In particular, by simplifying the internal structure, the optical module may be manufactured to be reduced in size, and optical coupling efficiency may be enhanced by a simplified optical path.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| | |
|---|---|
| 200: optical module | 150: external housing |
| 160: optical fiber | 155: lead-in hole |
| 100: optical module frame | |
| 10: stem | 12: stem pin |
| 17: optical active element | 17a: optical reception element |
| 17b: optical transmission element | 18: optical signal |
| 18a: first optical signal | 18b: second optical signal |
| 20: stem cap | 25: window |
| 30: frame unit | 36: connection part |
| 36a: connection ring | 38: filter unit |
| 38a: filter hole | 38b: filter hole |
| 40: optical waveguide element | 50: lens |
| 60: optical filter | 62: first filter |
| 64: second filter | |

What is claimed is:

1. A multi-channel optical module comprising:
   a stem configured to allow an optical active element transmitting and receiving an optical signal to be installed thereon;
   wherein the optical active element includes:
      a laser diode configured to emit a light source having a specific wavelength; and
      a photodiode configured to receive a light source having a specific wavelength;
   an optical module frame connected to the stem and configured to have an optical element forming an optical path corresponding to the optical active element; and
   an external housing configured to house the optical module frame therein and coupled to the stem,
   wherein the optical element includes:
      a lens and a filter unit disposed in the optical path and an optical waveguide element to which an optical fiber is connected;
   wherein the optical waveguide element includes:
      an optical coupler configured to transmit the light source having the specific wavelength emitted from the laser diode to the optical fiber; and
      an optical splitter configured to divide a single optical signal transmitted from the optical fiber into optical signals having the same strength and transmit the optical signals to the photodiode.

2. The multi-channel optical module of claim 1, wherein:
   the optical module frame includes
   a connection ring vertically connected to the stem and connected along an outer side of the stem.

3. The multi-channel optical module of claim 1, wherein:
   the filter unit is disposed on both sides of the optical module frame to form the optical path.

4. The multi-channel optical module of claim 1, wherein:
   the filter unit includes:
   an optical filter configured to allow a specific wavelength to be reflected or transmitted; and
   a filter holder allowing the optical filter to be installed to be sloped therein.

5. The multi-channel optical module of claim 4, wherein:
   the filter holder is formed to be sloped at 45°.

6. The multi-channel optical module of claim 1, wherein:
   the lens is disposed on both sides of the optical module frame and positioned below the filter unit to correspond to the filter unit to form the optical path.

7. The multi-channel optical module of claim 1, further comprising:
   a stem cap configured to protect the optical active element and connected to the stem.
8. The multi-channel optical module of claim 7, wherein:
   the stem cap includes a window, and the window is formed of sapphire glass or glass.

* * * * *